UNITED STATES PATENT OFFICE.

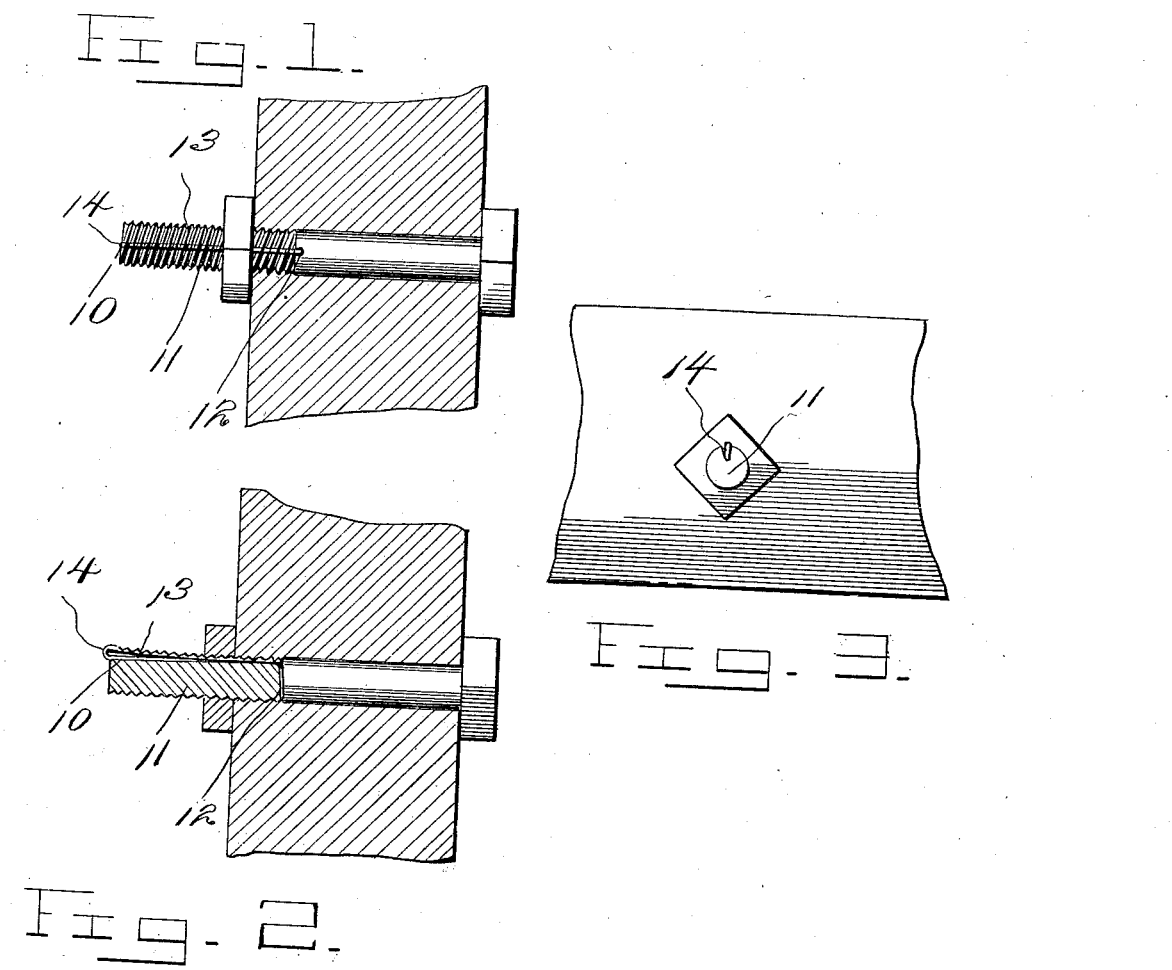

JACOB B. SMILEY, OF CHICAGO, ILLINOIS.

NUT-LOCK.

No. 840,390. Specification of Letters Patent. Patented Jan. 1, 1907.

Application filed June 27, 1906. Serial No. 323,634.

*To all whom it may concern:*

Be it known that I, JACOB B. SMILEY, a citizen of the United States, residing at Chicago, in the county of Cook, State of Illinois, have invented certain new and useful Improvements in Nut-Locks; and I do hereby declare the following to be a full, clear, and exact description of the invention, such as will enable others skilled in the art to which it appertains to make and use the same.

This invention has relation to that class of nut-locks in which the nut is left intact and is kept in place on the bolt by means connected with the latter.

In order to retain nuts on their threaded bolts by a so-called "lock," it is not essential, as is sometimes indicated, that the lock should be "positive" or, in another word, "rigid." The nut will be kept in place on the bolt when it is easier for it to remain in the place to which it is turned than it is to move therefrom. When once it is held in place with sufficient energy to prevent it from coming off or getting loose, all the additional locking or holding energy that may be applied to it will not render it more secure.

In the provision of my improvements I have provided a nut-lock that in operation holds the nut in place on the bolt without tendency of getting loose and coming off, though not rigidly or positively held.

The invention consists of a construction and means that are clearly shown in the annexed drawings, forming a part of this specification, and in view of which the invention will be described.

Of the drawings, Figure 1 is a side elevation of the lock in use. Fig. 2 is a longitudinal section. Fig. 3 is an end view.

Similar figures of reference designate similar parts or features, as the case may be, wherever they occur.

In carrying out my invention I provide a longitudinal groove 10 in the threaded portion of the bolt 11, extending from its end inward to an extent necessary and in accordance with circumstances. The groove 10 is made gradually shallower from its outer end inward, and just before disappearing a hole 12 is made radially in the bolt for the reception of the inner end of the wire spring 13, which forms an element of the invention. The said spring 13 comprises a length of tough resilient wire doubled upon itself for a portion of its length and having a portion of its outer surface nicked in accordance with the thread of the bolt. The bent-over or doubled portion 14 of the wire extends under the longer arm, for the reason that it operates to throw the longer arm or length upward, and no stop is formed to keep the nut from being turned off when this is purposely undertaken.

Under the construction mentioned the spring can be depressed in its groove so that the nut can be started and turned on the bolt, the spring adjusting its thread to that of the bolt; but after the nut covers the end of the bolt or is turned in farther the under arm of the spring will press outward the part above it, so as to keep the nut from turning back. When the nut is turned firmly "home" under this invention and an attempt is made to start it back, the wire engaged by the thread will spring outward appreciably, displacing its thread relatively to the thread of the bolt, so that there is no longer an exact continuity at the thread on the wire with that on the bolt, and hence it requires more energy than the nut would be subjected to in use to turn it off. Hence it keeps its place.

The spring being doubled upon itself for a portion of its length and the threading of the same on its outside are important features of the invention.

What is claimed as the invention is—

A nut-lock comprising the threaded bolt provided with a longitudinal groove extending from the end inward and provided with a hole at its inner end, and a wire spring doubled for a portion of its length upon itself, the short part of the doubled portion extending under the longer portion, the outer surface of the spring from end to end being nicked or screw-threaded and the inner end of the latter portion being provided with a right-angular bend extending into the hole at the end of said groove.

In testimony whereof I affix my signature in presence of two witnesses.

JACOB B. SMILEY.

Witnesses:
ANTONIETTE E. PIRRIE,
PETER G. PIRRIE.